US011818716B2

(12) United States Patent
Fouad et al.

(10) Patent No.: US 11,818,716 B2
(45) Date of Patent: Nov. 14, 2023

(54) USER EQUIPMENT ASSISTANCE FOR RESOURCE SELECTION IN NEW RADIO VEHICLE TO EVERYTHING

(71) Applicant: Samsung Electronics Co., Ltd., Gyeonggi-do (KR)

(72) Inventors: Yaser Mohamed Mostafa Kamal Fouad, San Diego, CA (US); Jung Hyun Bae, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 185 days.

(21) Appl. No.: 17/349,205

(22) Filed: Jun. 16, 2021

(65) Prior Publication Data

US 2022/0022179 A1    Jan. 20, 2022

Related U.S. Application Data

(60) Provisional application No. 63/061,984, filed on Aug. 6, 2020, provisional application No. 63/053,220, filed on Jul. 17, 2020.

(51) Int. Cl.
*H04W 72/20*    (2023.01)
*H04W 4/40*    (2018.01)
*H04J 13/00*    (2011.01)
*H04W 72/02*    (2009.01)

(52) U.S. Cl.
CPC ......... *H04W 72/20* (2023.01); *H04J 13/0062* (2013.01); *H04W 4/40* (2018.02); *H04W 72/02* (2013.01)

(58) Field of Classification Search
CPC ....... H04W 72/20; H04W 4/40; H04W 72/02; H04W 28/26; H04W 76/14; H04W 72/51; H04W 92/18; H04J 13/0062; H04L 5/0053; H04L 5/0055
See application file for complete search history.

(56) References Cited

U.S. PATENT DOCUMENTS

| 2014/0206322 A1* | 7/2014 | Dimou ................ H04W 4/70 455/414.1 |
| 2019/0044667 A1 | 2/2019 | Guo et al. |
| 2020/0029340 A1 | 1/2020 | He et al. |
| 2020/0314940 A1 | 10/2020 | Park et al. |

(Continued)

FOREIGN PATENT DOCUMENTS

| EP | 3 672 133 | 6/2020 |
| WO | WO-2019066706 A1 * | 4/2019 |
| WO | WO-2022000177 A1 * | 1/2022 |

OTHER PUBLICATIONS

Zhang, "NR-V2X-Based Coordination Method Between UEs", Jan. 6, 2022, WO, WO 2022000177, English translation. (Year: 2022).*
LG Electronics, "Discussion on resource allocation for NR sidelink Mode 2", Apr. 12, 2019, 3GPP TSG RAN WG1 #96bis Xi'in, China, R1-1905439 (Year: 2019).*
Spreadtrum Communications, "Discussion on Resource Allocation for Mode 2", R1-1813085, 3GPP TSG RAN WG1 Meeting #9 5, Nov. 12-16, 2018, 7 pages.

(Continued)

*Primary Examiner* — Michael K Phillips
(74) *Attorney, Agent, or Firm* — The Farrell Law Firm, P.C.

(57) ABSTRACT

A method and user equipment (UE) are provided. The method includes transmitting, from a first UE, an assistance request to at least one neighboring UE, receiving, by the first UE and from the at least one neighboring UE, assistance information including an indication of at least one resource for transmission, and transmitting, from the first UE, over the indicated at least one resource.

20 Claims, 6 Drawing Sheets

(56) References Cited

U.S. PATENT DOCUMENTS

| | | |
|---|---|---|
| 2020/0322095 A1 | 10/2020 | Park et al. |
| 2020/0344574 A1 | 10/2020 | Park et al. |
| 2021/0144570 A1* | 5/2021 | Chae .................... H04W 72/044 |
| 2021/0212029 A1* | 7/2021 | Zhao ................. H04W 28/0278 |
| 2021/0321396 A1* | 10/2021 | Li ......................... H04L 1/1887 |
| 2021/0329596 A1* | 10/2021 | Freda .................. H04W 72/541 |
| 2021/0345396 A1* | 11/2021 | Yu ..................... H04W 72/0473 |
| 2022/0022179 A1* | 1/2022 | Fouad ................. H04J 13/0062 |
| 2022/0046437 A1* | 2/2022 | Lee ........................ H04W 76/14 |
| 2022/0124729 A1* | 4/2022 | Ji .......................... H04L 5/0055 |
| 2022/0173854 A1* | 6/2022 | Chae .................... H04L 1/1893 |
| 2022/0240296 A1* | 7/2022 | Lee .......................... H04W 4/40 |
| 2022/0256579 A1* | 8/2022 | Ji .......................... H04L 1/1861 |
| 2022/0303952 A1* | 9/2022 | Hoang ................ H04W 72/542 |
| 2022/0394560 A1* | 12/2022 | Yu ..................... H04W 72/0453 |

OTHER PUBLICATIONS

Huawei, HiSilicon, "On Sidelink Enhancement", R1-2004602, 3GPP TSG RAN WG1 Meeting #101-e, May 25-Jun. 5, 2020, 3 pages.
European Search Report dated Dec. 10, 2021 issued in counterpart application No. 21185295.9-1215, 11 pages.
LG Electronics, "New WID on NR sidelink enhancement", 3GPP TSG RAN Meeting #86 RP-193231, Sitges, Spain, Dec. 9-12, 2019 (revision of RP-193134), 6 pages.
3GPP TS 38.214 V16.0.0 (Dec. 2019), 3rd Generation Partnership Project; Technical Specification Group Radio Access Network; NR; Physical layer procedures for data (Release 16), 148 pages.
3GPP TS 36.213 V15.7.0 (Sep. 2019), 3rd Generation Partnership Project; Technical Specification Group Radio Access Network; Evolved Universal Terrestrial Radio Access (E-UTRA); Physical layer procedures (Release 15), 551 pages.

* cited by examiner

USER EQUIPMENT ASSISTANCE FOR RESOURCE SELECTION IN NEW RADIO VEHICLE TO EVERYTHING

PRIORITY

This application is based on and claims priority under 35 U.S.C. § 119(e) to U.S. Provisional Patent Application Ser. No. 63/053,220, filed on Jul. 17, 2020, and 63/061,984, filed on Aug. 6, 2020, the entire contents of which are incorporated herein by reference.

FIELD

The present disclosure is generally related to resource selection in new radio (NR) vehicle to everything (V2X) environments.

BACKGROUND

In NR V2X, a Mode 2 resource selection procedure provides a set of candidate resources for higher layer that can be selected for transmission. However, since this mode operates in a distributed manner, it is essential to adjust the resource selection procedure in order to improve its reliability and reduce its latency. In particular, in case of periodic transmissions, there might be scenarios in which user equipments (UEs) end up consistently colliding with neighboring ones, thereby impeding the system performance. In addition, due to the distributed nature, the hidden node problem exists in V2X systems which significantly impacts the performance

SUMMARY

According to one embodiment, a method includes transmitting, from a first UE, an assistance request to at least one neighboring UE, receiving, by the first UE and from the at least one neighboring UE, assistance information including an indication of at least one resource for transmission, and transmitting, from the first UE, over the indicated at least one resource.

According to one embodiment, a first UE includes a memory and a processor configured to transmit, an assistance request to at least one neighboring UE, receive, from the at least one neighboring UE, assistance information including an indication of at least one resource for transmission, and transmit over the indicated at least one resource.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In NR V2X, a UE can operate in Mode 2 and accordingly select the resources for transmission independently from the base station (gNB). In this mode, the UEs define a sensing window and a resource selection window. In the sensing window, all UEs that are not transmitting are required to monitor all subchannels to detect sidelink control information (SCI) transmitted by their neighbors. Once an SCI is detected, its reference signal receive power (RSRP) is measured and a set of resources can be considered as occupied in future slots within the resource selection window. This is because an SCI can indicate up to two future resources (i.e., subchannels and slots) as well as a periodicity in case of periodic transmissions. Subsequently, the sensing UE can identify a set of resources that are occupied in its resource selection window in order to avoid them. Despite the advantages of this procedure in reducing collisions (i.e., interference), its ability to avoid collisions is limited by a UE's sensing range. In particular, a UE will not be able to detect potentially interfering UEs outside its sensing range thus leading to collision. This can happen due to the hidden node problem.

Figure 1:
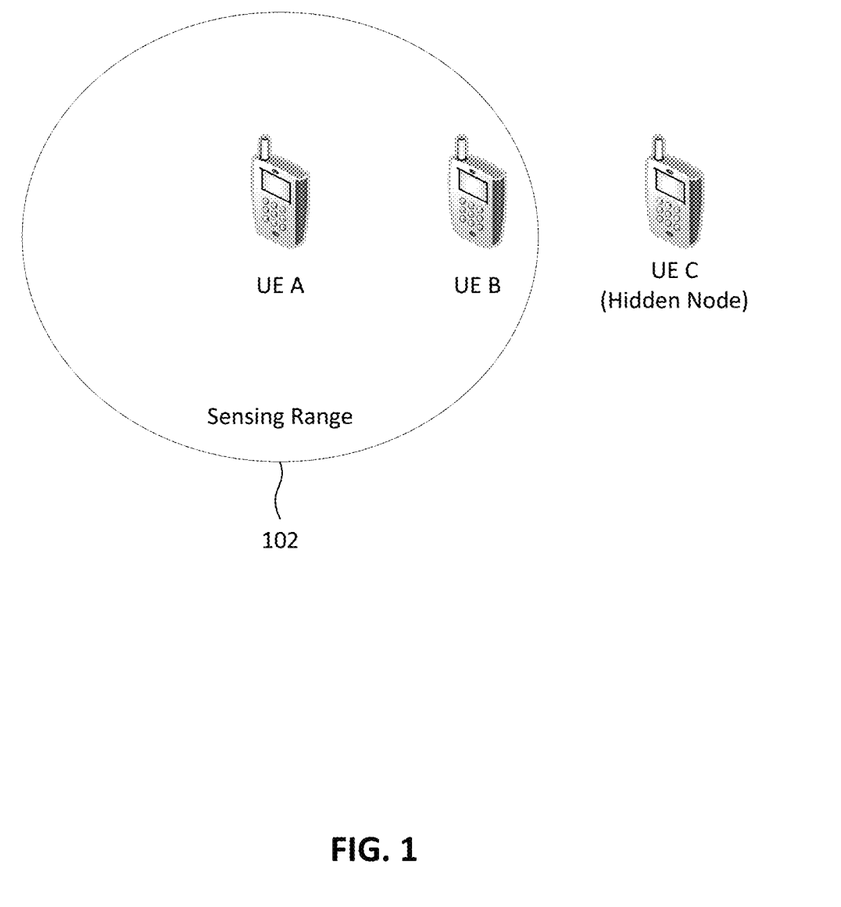
FIG. 1 illustrates a diagram of the hidden node problem, according to an embodiment.

FIG. 1 illustrates a diagram of the hidden node problem, according to an embodiment. For example, in FIG. 1, if UE A attempts to communicate with UE B, it might interfere with the transmission of UE C despite being outside of its sensing range 102. This issue is also magnified in the case of periodic transmissions if nodes A and C select the same initial resource and period, thus leading to consistent transport block (TB) losses. In addition to the hidden node problem, the communication between the two nodes (UE A and UE B) in FIG. 1 can be also lost due to the half-duplex limitation. In particular, if UE A selects a resource that is also selected by UE B for transmission, then the TB sent from UE A to UE B will also be lost since UE B will not be able to receive it. This scenario can also cause significant degradation of performance in the case of periodic transmissions because UEs A and B can consistently lose the transmitted TBs if they both select the same transmission period and initial resource.

To address the drawbacks of Mode 2, several approaches are disclosed herein to improve the system's reliability and latency while supporting both periodic and aperiodic traffic types. In particular, some approaches disclosed herein may include sending an SCI with explicit/implicit indication to request resource selection assistance, imposing a restriction on the resource assistance requests based on different parameters such as priority, channel busy ratio (CBR) and channel occupancy ratio (CR), restricting the assistance request to retransmissions rather than initial transmission in the case of aperiodic traffic or allowing the receiver (Rx) UE to discard assistance reporting in the case of successful transmission, allowing the Rx UE to relay the resource reservation request in order to avoid the hidden node problem, allowing piggybacking of resource selection assistance information in SCI with a flag, allowing the UE to perform additional SCI transmission in the second half of the slot to help with low latency applications, reducing $C_{Reselection}$ to avoid consistent collisions based on hybrid automatic repeat request (HARQ) feedback or Rx UE assistance, allowing the transmission (Tx) UE to request a list of active periodic transmissions from the Rx UE to avoid consistent collisions due to half duplex constraint, and/or utilizing the location information to overcome the exposed terminal problem.

To improve the performance of the resource selection procedure in NR V2X, according to one embodiment, one approach is to enable the Tx UE to request assistance from the RX UE(s). In this case, the Tx UE may send an SCI with a flag indicating resource selection assistance request. This flag may be either explicit by setting one or more bits in the SCI or implicit by setting one or more fields in the SCI to a reserved value (e.g., setting the periodicity field to a value beyond the pre-configured periodicities for the resource pool might be used to indicate a resource assistance request). This resource assistance request may also be dedicated to a specific UE by sending the destination identification (ID) or it may be sent in a broadcast mode (e.g., by using a reserved ID) in order to enable UE resource selection assistance in groupcast and broadcast. The Tx UE may also specify the resources over which it expects the UE assistance report. These resources may be either included in the payload or as future reservations in the SCI. This helps in reducing the power consumption by limiting the number of resources the UE has to monitor in the case of power limited UEs and also ensures the resource assistance information can be received in a timely manner. There may be collisions between the UEs providing the assistance information in case the request was done in broadcast/groupcast mode. To address this problem, UEs may generate a random backoff based on their IDs before providing the assistance information. During that backoff time, each UE monitors the available subchannels (either all or the ones specified by the Tx UE). If an SCI is detected with a destination ID equal to the UE that requested the assistance information, the payload is decoded to check the presence of assistance information. In this case, if assistance information is found, the UE discards the assistance information reporting request.

A power-limited UE that does not perform sensing may also benefit from UE assistance irrespective of the hidden node problem. In particular, a power-limited UE may request assistance from neighboring UEs in order to avoid future collisions since it is not aware of the resources already reserved by its neighboring UEs. In this case, once the UE wakes up with data to transmit, it attempts to perform an initial transmission on one or a limited number of subchannels. However, if the data to transmit does not fit within the subchannel in a given slot, it may raise a flag to indicate an assistance request for future resource selections. In particular, the UE assistance may be performed as follows.

First, the power-limited UE may send an SCI over one subchannel with a flag set to a value (e.g., 1) to request assistance. The payload may carry some information about the traffic type (e.g., periodic/aperiodic, priority, size, packet delay budget (PDB), etc.) to facilitate the resource selection by the assisting UE (e.g., number of subchannels). Then, the SCI may indicate the ID of the UE from which assistance is requested if known (this can be helpful if a UE already selected a neighboring UE to assist with resource selection in relatively static cases). One example of such relatively static cases is an intersection. For example, there may be a fixed node (e.g., road side unit (RSU)) at each intersection that performs sensing of the occupied resources (this fixed node may also be alternating relatively slowly between the vehicle UEs approaching/exiting the intersection). Once a power-limited UE approaches this intersection, it may send an assistance request to this node for resource assistance selection information occasionally. For example, a power-limited UE may require sending a message only when it attempts to cross the intersection to alert neighboring cars and thus may request assistance for resource selection only at this instance. The SCI may not perform any future reservations since little to no information is known about the reserved resources by neighboring UEs. The power-limited UE requesting assistance may continue to monitor the resource pool for assistance information. If a specific UE is designated for assistance, it may respond back by sending information regarding the suggested resources to use for transmission. This information may be either carried in the SCI through a future resource reservation or carried in the payload. Once the UE requesting assistance receives the information, it may proceed with transmission over the indicated resources, or it may consider the assistance information and determine, based on the assistance information, over which resources to proceed with the transmission. While the indicated resources may be utilized for the transmission, the UE may consider the indicated resources for transmission, but then utilize different resources for transmission. If no response is received (e.g., non-decodable SCI, no neighboring UEs available to assist), a timer may be set and when this timer expires, it may either force the UE to either request UE assistance or perform the transmission. This decision may also be based on the PDB of the pending data. The resources used for the data transmission or the assistance request may be either randomly selected or the resource selection procedure can take the sensing information while the UE was waiting for assistance into consideration.

Thus, according to one embodiment, Tx UEs may send SCI to request assistance information for resource selection either to a dedicated UE or to all neighboring UEs. This request may be either explicit in a field in the SCI or implicit by using reserved values for one or more SCI fields. To reduce collisions, this request may be restricted to be transmitted on a limited number of subchannels (e.g., one subchannel) in the case of power-limited UEs.

Figure 2:
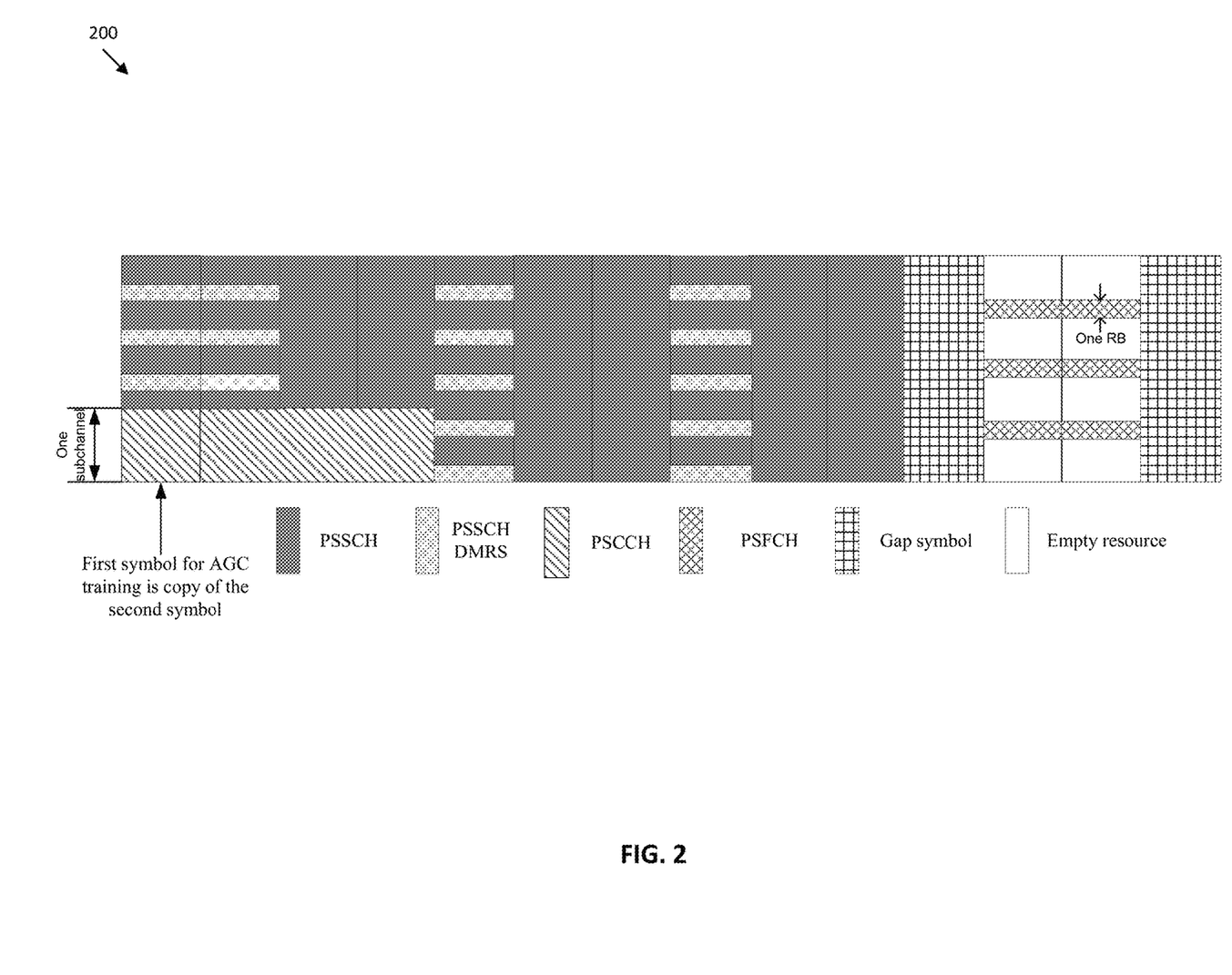
FIG. 2 illustrates a diagram of a sidelink slot with a physical sidelink feedback channel (PSFCH), according to an embodiment.

FIG. 2 illustrates a diagram of a sidelink slot 200 with a PSFCH, according to an embodiment. The PSFCH channel may be used to transmit the feedback information from the Rx to the Tx UEs. It may be used for Unicast and groupcast options 1 and 2. In the case of unicast and groupcast option 2, the PSFCH is used to transmit ACK/NACK whereas for the case of groupcast option 1, the PSFCH carries only NACK. For sidelink feedback, a sequence-based PSFCH format (PSFCH format 0) with one symbol (not including automatic gain control (AGC) training period) is supported.

In PSFCH format 0, the ACK/NACK bit is transmitted through two Zadoff-Chu (ZC) sequences of length 12 (same root but different cyclic shift), whereby the presence of one sequence indicates an ACK and the presence of the other indicates a NACK (i.e., these sequences are used in a mutually exclusive manner). Since sequences are used to convey the ACK/NACK to the transmitter, feedback from multiple UEs may be multiplexed on the same physical resource block (PRB). In particular, in the current design, up to 6 ACK/NACKs from 6 UEs can be multiplexed on the same PRB (12 subcarriers) by using different cyclic shifts. In this case, each UE is assigned the same root sequence but with two cyclic shifts (one for ACK and another for NACK). The main purpose of using this code division multiplexing (CDM)-based format is due to the case of groupcast option 2 in which multiple ACK/NACK feedbacks are expected from different UEs per physical sidelink shared channel (PSSCH) transmission. For groupcast option 2, ACK/NACKs from different UEs may be transmitted on the same PRB by allocating two different sequences for each UE to use for its ACK/NACK transmissions and, in this case, the sequences and the PRB used by each UE will depend on a unique ID. On the other hand, for groupcast option 1, only a NACK is required and thus the cyclic shift corresponding to the ACK message is not used and all the UEs included in the groupcast will use the same sequence and PRB for NACK. To support AGC, the resource elements used for the PSFCH may be duplicated in the immediately preceding OFDM symbol (this implies that two consecutive symbols are always used for transmission of PSFCH format 0). Subsequently, the first symbol may be used for AGC training after the Tx/Rx switch. In addition, at least one symbol is used for the gap right after PSSCH transmission and another is used after the PSFCH transmission to allow for Tx/Rx switching as shown in FIG. 2.

For the period of N slot(s) of the PSFCH resource, three values are supported (i.e., N=1, N=2, and N=4). These values define the periodicity of the PSFCH resource and subsequently it's associated overhead. For a PSSCH transmission with its last symbol in slot n, when the corresponding HARQ feedback is due for transmission, it is expected to be in slot n+a, where a is the smallest integer larger than or equal to K logical slots (i.e., slots within the PSSCH resource pool) with the condition that slot n+a contains PSFCH resources and K is equal to 2 or 3.

According to one embodiment, power-limited UEs may request assistance for resource selection by sending either a dedicated PSFCH sequence or a selected PSFCH sequence from a pool. The UE receiving the sequence may respond by providing the assistance information to a specific UE using its ID if a dedicated sequence is used or using an ID corresponding to the PSFCH sequence that is randomly selected from a pool.

Power-limited UEs may request assistance from neighboring UEs in order to avoid future collisions. These assistance requests may be sent in the form of dedicated sequence(s) on a PSFCH resource(s). Subsequently, a UE receiving the dedicated PSFCH sequence may provide assistance information regarding the resources available for transmission. The available PSFCH sequences for the assistance request(s) may be either provided in the form of a pool of sequences or may be dedicated to the limited-power UEs beforehand. In particular, a limited-power UE may be dedicated a specific sequence on a pre-selected PRB/subchannel. Alternatively, a set of available sequences may be used by any limited-power UE requesting assistance. In the former case, the available resources may be indicated directly to the requesting UE since its ID is known (i.e., the assisting UE will know the requesting UE through its dedicated sequence and PRB/subchannel). In the latter case, an approach similar to random access may be considered in which the assistance information is provided with an ID based on the selected PSFCH resource for the assistance request. This is because multiple UEs may request assistance simultaneously and thus the assistance information may be sent to each one separately to avoid collisions.

According to one embodiment, to improve the system performance, the system may limit the resource assistance requests based on CBR, CR, priority, periodicity, TB size, and/or packet delay budget, to reduce the resource assistance overhead. In some cases, the system may be highly occupied or the TB to be transmitted may be small or has low priority and thus UE resource selection assistance may not be favorable. To address this concern, the system may limit the resource assistance request based on CBR. If the CBR is too high, the system will be overloaded and collisions will occur on the resource assistance request, thereby hindering its reliability. In addition, there might not be enough resources to carry the resource assistance report. The system may limit the resource assistance request based on CR. Since the assistance request must be sent, it may increase the UE's CR towards its CR limit. In this case, the UE may not be able to meet the packet delay budget when the assistance information arrives as it will not be able to transmit due to reaching its CR limit. The system may limit the resource assistance request based on a priority level. Depending on the priority level, the UE may elect to request for resource selection assistance or not. In particular, it may be favorable to request assistance for higher priority traffic only in order to reduce the overhead and increase the chances of reliable transmissions. The system may limit the resource assistance request based on periodicity. Since periodic transmissions may result in consistent collisions between UEs, it may be given higher priority for resource assistance requests. For example, resource assistance requests may be limited only to periodic traffic. The system may limit the resource assistance request based on TB size. If the TB size is small, it may not be beneficial to request resource assistance information especially in highly occupied scenarios. The system may limit the resource assistance request based on PDB. Given the PDB, it may not be possible to request resource selection assistance. In particular, a resource assistance request involves at least two transmissions (i.e., resource assistance request and reporting). In this case, this may be beyond the PDB, especially in highly occupied systems and thus it may not be beneficial to get assistance in such cases.

According to one embodiment, to reduce the resource assistance overhead, a UE may be allowed to request assistance only if initial transmission fails (i.e., only for TB retransmissions). Alternatively, Rx UE may discard the assistance request in case the initial transmission of aperiodic traffic is successful. To limit the resource assistance overhead, the system may restrict the assistance to TB retransmissions. For example, this restriction may be imposed only for aperiodic traffic in cases of groupcast and unicast. This is because for aperiodic traffic, the first TB transmission may be successful, thereby eliminating the need for assistance and its associated overhead. Alternatively, the Rx UE may be allowed to discard the assistance request for aperiodic retransmissions in case it was successful.

According to one embodiment, to avoid the hidden node problem, a UE may elect to relay the resource reservations of one or more of its neighbors. This relaying may be based on traffic priority and/or RSRP thresholds.

In some examples, the hidden node problem described above may limit the system performance. In particular, the limited sensing range of Tx UEs may result in TB collisions with neighboring UEs outside their sensing ranges. However, in case of the hidden node problem, the Rx UE will be aware of the potential collision as it may detect the resource selections of both UEs. Hence, the system may allow the Rx UE to relay the resource reservation of the Tx UE. In this case, the second tier neighbors may be aware of the potential collisions and accordingly adjust their resource selections. This relaying may be either requested by the Tx UE or done independently by the Rx UE either proactively or when it detects the presence of hidden node(s) with conflicting resource reservations. To request the relaying, this may be done either explicitly by setting a flag in the SCI or implicitly by setting one or more parameters to specific values. In addition, when the relaying SCI is being transmitted, it may include a flag that this is a resource reservation relaying either explicitly with a flag in the SCI or implicitly by setting one or more parameters to specific values (e.g., using the same Tx UE ID). The Rx UE may relay the resource reservation of the higher priority traffic as indicated by the SCI, the Rx UE may relay the resource reservation of the UE with higher RSRP thus requiring the Tx UE with worse channel conditions to change its resource selection, or the Rx UE may relay the resource reservation of the UE with lower RSRP in order to reduce its incurred interference and increase its reliability.

Several approaches may be utilized for a UE to perform this relaying. For example, one approach may be as simple as retransmitting the same SCI information at a later slot (with adjustments to the slot information). Alternatively, it may be sent as higher layer information in the payload. The Rx UE may attempt to relay the exact information received in the SCI with adjustments to the new slot timing. In particular, the Rx UE may maintain the same source ID, destination ID, priority, etc. However, the Rx UE may need to adjust the future resources indicated by the SCI since the relayed information are sent in a different slot compared to the original SCI. For example, if the original SCI was performing resource reservations for two slots in the future that are 3 and 5 slots ahead and the relaying occurs in the following slot after the initial transmission, then the future reservations will indicate resource reservations that are 2 and 4 slots ahead. Although this works well for aperiodic traffic, periodic traffic may face a discrepancy as the periodically indicated resources may be different from the original one. Thus, if the resources reserved in the past may be indicated in the SCI similar to the LTE V2X, then the periodic reservations in the relayed SCI may be adjusted to match that of the original transmissions. Alternatively, the UE may relay the SCI without the periodic reservation (i.e., relaying is done in each period separately). In such a case, no confusion occurs for the Tx UE when it receives the relayed resource reservation request because it will be able to detect the same Tx UE ID.

The relaying may be performed by the higher layers by including the resource reservation requests in the payload along with their associated information. In such a case, information about the future reserved resources as well as the resource reservation period may be included in the payload. The relaying may be performed by both SCI indication and higher layers. In particular, the SCI may either include an implicit or explicit flag that this is a resource reservation relaying. However, the information regarding the reserved resources may be included by the higher layers in the payload and carried by the PSSCH.

The system may consider how the relaying UE is selected. The system may allow the Tx UE to select the relaying UE(s) based on specific information (e.g., relative location). In this case, the relaying request flag along with the destination ID(s) will be used to identify the UEs that are expected to relay the information. Alternatively, it may be left to the Rx UE to perform the relaying when necessary (e.g., when a collision due a hidden node is detected).

In one embodiment, the system may consider the location information as an input factor when requesting resource selection assistance and/or relaying of resource selection information. To further reduce the chances of collisions due to the hidden node problem, a UE may request resource selection assistance based on the Rx UE location or the targeted UEs' locations. For example, assuming that a UE is targeting to send a TB(s) in a specific direction (e.g., a vUE attempting to send information along a highway), it may select one or more UEs for resource selection assistance based on their location along the highway. Alternatively, if the Tx UE attempts to communicate with an RX UE in location X but is not able to get assistance information from the Rx UE (e.g., due to limited delay budget or limited power budget), the Tx UE may select any neighboring UE within the same location for assistance. In addition, the Tx UE may also request the relaying for the resource selection information based on the targeted UE(s) location. For example, if a Tx UE attempts to communicate with other UEs along a highway, it may require resource selection relaying to avoid the hidden node problem. In this case, the UE may also include the desired direction/location either in the SCI or in the payload and accordingly the Rx UE(s) decide whether to relay the resource reservation or not.

In one embodiment, if UEs are capable of beam selection, a UE may direct its beam such that the resource assistance request is sent only in the direction of the target UE(s) location. In some examples, vehicle UEs may be able to perform beam selection to reduce the interference and improve the data rates. However, in such scenarios, the hidden node problem may be more pronounced as the vehicle UEs may not be able to sense SCIs in all directions. In addition, UEs may also be interested in assistance information only in the desired directions for transmitting their TBs. To address this concern, the UE may direct its Tx beam such that the resource selection assistance request is sent only in the direction of the target UE(s) location.

According to one embodiment, to reduce the resource assistance overhead, the system may allow the Rx UE to piggyback the resource selection assistance information in SCI. In particular, a flag may be included in the SCI to indicate that the future resources indicated by the SCI are not reserved. Subsequently, these resources may be considered as recommended resources for future transmissions by the Tx UE. This reserves the resources by eliminating the need for transmitting the UE resource assistance information in the PSSCH thereby not affecting the payload.

According to one embodiment, the system may allow the Rx UE to transmit partial/full resource selection assistance information within the same slot to accommodate high priority UEs with limited PDB. The indication for low PDB may be included either implicitly or explicitly in the SCI sent by the Rx UE. To meet the stringent latency requirement of high priority traffic, the system may reduce the time required for resource assistance requests. In particular, an explicit/implicit flag may be included in the SCI to indicate low packet delay budget and to request for immediate assistance information. To meet this objective, one possible approach is to allow the Rx UE to transmit either partial or full resource assistance information in the same slot in which the assistance request was transmitted. A selected destination UE(s) may be requested to provide resource selection feedback.

Figure 3:
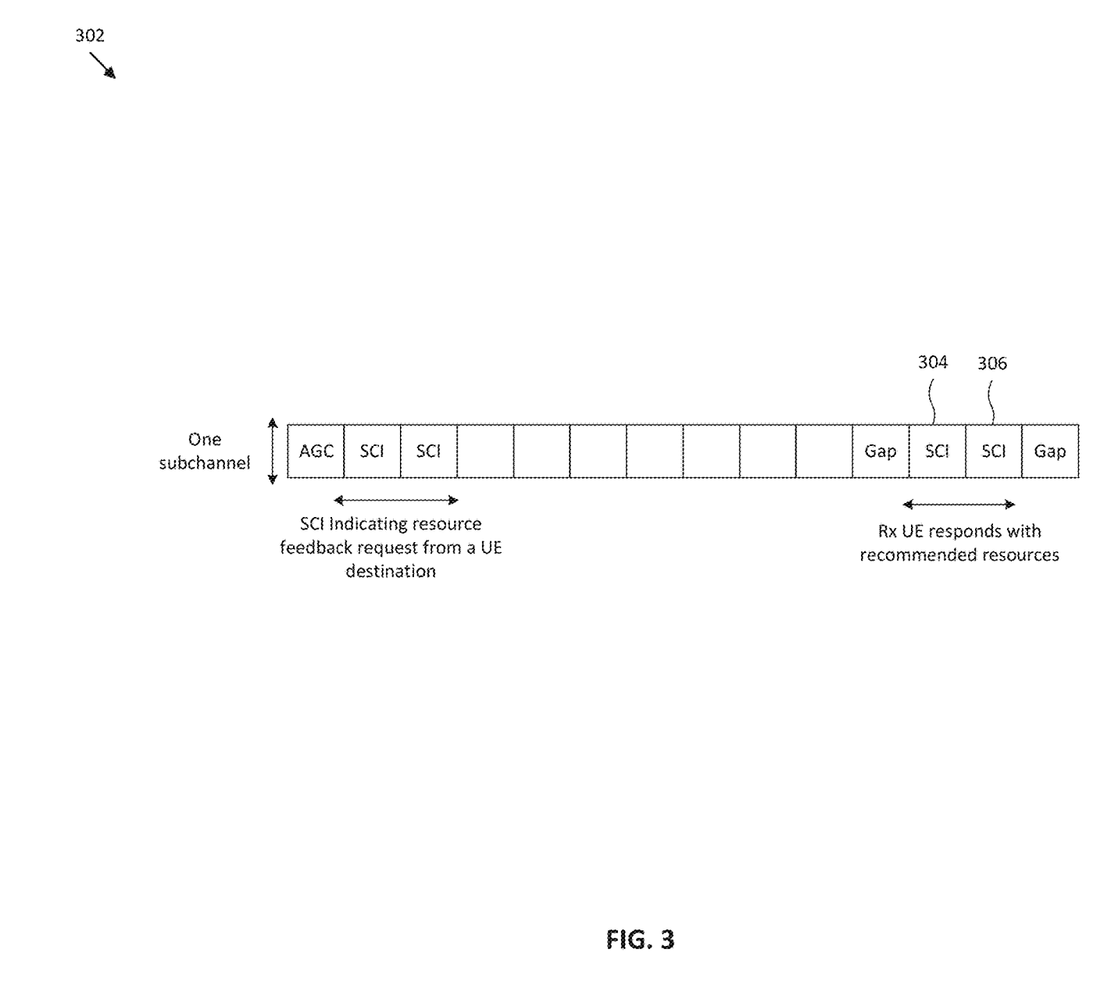
FIG. 3 illustrates a diagram of a sidelink slot, according to an embodiment.

FIG. 3 illustrates a diagram of a sidelink slot, according to an embodiment. The requesting UE may send an SCI including destination UE ID and a special flag requesting immediate resource selection assistance. Either no PSSCH data is included or it may be included but processed at later slots. The Rx UE may respond after decoding the SCI by generating an SCI with recommended resources. The generated SCI may be carried in the same slot 302 on the last OFDM symbols 304 and 306. The symbols 304 and 306 may be unutilized PSFCH symbols.

It may not be required for the Rx UE to send the SCI with the assistance information within the same slot. In other words, it may depend on the Rx UE implementation. However, to enable assistance for UEs with stringent latency requirement, the sensing window for the resource assistance information may be started within the same slot. In this case, if the Rx UE was a high capability UE, then the Tx UE will get the assistance information immediately within the slot. In addition, the Tx UE may also request assistance from a specific UE that is known to have higher capability but not necessarily the Rx UE. In particular, in case of platooning, the Tx UE may request assistance from the platoon head in order to obtain the resources thus it may select a UE with the highest capability to reduce the latency.

In one embodiment, to overcome the issue of consistent collisions, the system may allow UEs to reduce their randomly selected number for resource reselection ($C_{reset}$). This reduction may be based on HARQ feedback when it is enabled or on the assistance information when HARQ feedback is disabled. A drawback of the mode 2 resource selection procedure of Rel-16 NR V2X is the possibility of consistent collisions. In particular, in case of periodic transmissions, a UE is expected to maintain its periodic selected resources until the end of $C_{reset}$. However, there may be cases in which two UEs select the same periodic resources and thus consistently collide for long durations. To address this drawback along with the hidden node problem, the system implements two approaches depending on whether feedback is enabled or disabled. If feedback is enabled, a UE may elect to reduce its $C_{reset}$ when it does not receive HARQ feedback for 'X' number of times over one or multiple periods (e.g., due to the half-duplex) or when it receives NACK for 'Y' number of times over one or multiple periods (e.g., due to the hidden node problem). In NR Rel-16, a UE is able to detect three cases when HARQ feedback is enabled (i.e., ACK, NACK and discontinuous transmission (DTX) due to absence of NACK). If feedback is disabled, a UE may elect to reduce its $C_{reset}$ based on the assistance information received from the Rx UE.

In one embodiment, to overcome the half duplex issue, the Tx UE may request the Rx UE to provide a list of active periodic transmissions. By matching this list with the previously decoded SCIs, the Tx UE may identify the overlapping periodic transmissions and adjust accordingly to avoid consistent packet losses. To avoid consistent packet loses due to the half-duplex constraint, the system may rely on aligning periodic transmissions. In particular, the Tx UE may request the Rx UE to provide a list of active periodic transmissions. This request may be included either implicitly or explicitly in SCI. Alternatively, it may be included as a higher layer parameter to reduce the SCI overhead. Subsequently, the Rx UE responds by providing a list of the periods of its current transmissions. This may be carried as a higher layer parameter as the number of periods configured per resource pool may be large and thus beyond the capacity of SCI. Once this is received, the Tx UE will be aware of the periods reserved by the Rx UE and may identify possible consistent packet loses due to the half-duplex issue. This may be done by matching the periodic reservations identified through previously decoded SCIs with the ones received in the assistance report to identify potentially overlapping periodic transmissions.

Figure 4:
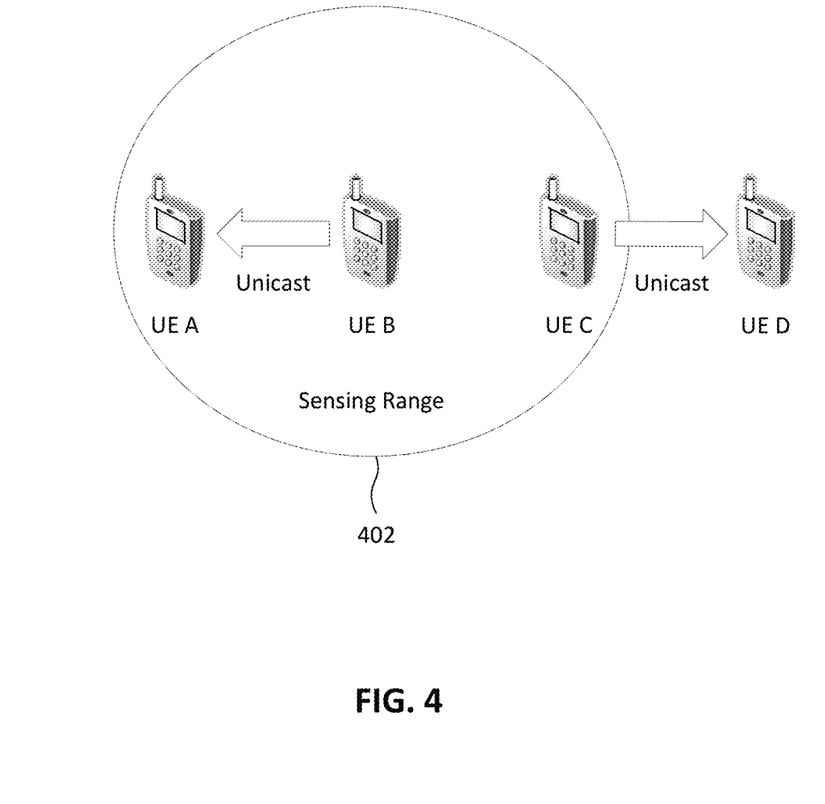
FIG. 4 illustrates a diagram of the exposed node problem, according to an embodiment.

FIG. 4 illustrates a diagram of the exposed node problem, according to an embodiment. Due to the distributed nature of the mode 2 resource selection, the system is vulnerable to the exposed node problem. In particular, two nodes may not be able to utilize the same resource for transmission despite being far apart, thereby hindering the resource utilization efficiency. For example, UE B may be within the same sensing range 402 of UE C, and thus UE C can detect its resource reservation. However, if UE C is attempting to communicate with UE D and UE B is attempting to communicate with UE A then both transmissions should not be interfering because UE D is out of the transmission range of UE B and UE A is out of the transmission range of UE C. However, given that UE C sensed the reservation of UE B, UE C will not be able to utilize the same set of resources, thereby resulting in the exposed node problem.

According to one embodiment, to overcome the exposed terminal problem, the system may require all UEs to include their location information in SCIs when transmitting (i.e., include the location information in unicast/groupcast option 2/broadcast transmissions). The UEs may use the location information indicated in the SCI in order to alleviate the impact of the exposed node problem on the resource utilization efficiency of the system. In particular, in NR Rel-16, a UE transmits location information in SCI in case of groupcast option 1. This information is necessary so that neighboring UEs may decide whether to provide HARQ feedback or not. This may be extended in further releases by requiring all UEs to provide their location information. Once the location information of the neighboring UEs is available at a UE, it may use it as an input to the resource selection procedure of Mode 2 thus deciding whether a resource may be used or not (i.e., to resolve the exposed node problem). In particular, in FIG. 4, for example, if UE B is aware of the locations of UE A and UE C and knows that their inter-UE distance is larger than a predetermined threshold, then it may use the same resource reserved by UE C to communicate with UE A.

According to one embodiment, the system may update the Mode 2 resource selection procedure to pass the resources received in the assistance report and/or the resources selected based on sensing, the system may update the Mode 2 resource selection procedure to exclude/penalize the resources indicated as occupied by the assistance reports, and the system may add a timer that impacts the validity of the resource assistance reports.

Once the assistance information becomes available, a Mode 2 resource selection procedure is required to take them into consideration according to the work item description (WID). To achieve this, the system may pass two sets of resources to the higher layer to select from (one based on sensing and the other based on the obtained assistance reports). The system may pass only the resources indicated by the resource assistance report (e.g., if the number of resources within the set is above a certain threshold to reduce the probability of collision). If some resources are indicated as reserved (e.g., due to the hidden node problem), the system may exclude them from the total set of resources before running the procedure. Alternatively, these resources may remain but may be penalized with a high hypothetical RSRP level. This level may be a pre-configured value that may be dependent on priority or the location of the Rx UE (e.g., increase the RSRP to a higher level if the Rx UE is far away). If some resources are indicated as reserved (e.g., due to the hidden node problem) but their priority is not known, a UE may set a pre-configured priority when handling these resources according to the Mode 2 resource selection procedure (e.g., when selecting the RSRP threshold). The system may add a timer on the validity of the resource assistance report (i.e., may reduce the probability of selecting/excluding the resources indicated in the report). The timer may be a function of the UE speed.

According to one embodiment, the Rx UE may proactively provide assistance information to the Tx UE after a number of failed re-transmissions and/or the detection of a conflicting hidden node. This may also be triggered by the priority of the Tx UE transmission. The assistance information may be indicated explicitly by raising a flag in the SCI or implicitly by setting one or more parameters in the SCI to specific values.

To further improve the system performance, an Rx UE may proactively provide assistance information to the Tx UE. This may occur if the Rx UE detects a set of a number of failed (re)-transmissions or when the measured RSRP is below a certain threshold. This resource selection assistance may also be triggered by the presence of a hidden node that is overlapping with the resources reserved by the Tx UE. Alternatively, it may also be triggered by the priority of the information to be sent by the Tx UE. In this case the Rx UE may provide the assistance information either in the SCI or in the payload to the Tx UE. The indication of the presence of assistance information may be either implicit or explicit. The indication may be explicit by raising a flag in the SCI and including the Tx UE ID as the destination ID. The indication may be implicit by setting one or more parameters of the SCI to specific values (e.g., setting the source ID to the Tx UE ID and the destination ID to the Rx UE ID).

According to one embodiment, the Rx UE may periodically provide assistance information to the neighboring UEs. The assistance information may be triggered by the CBR or the priority of neighboring UEs. The periodic assistance information may be indicated explicitly by raising a flag in the SCI or implicitly by setting one or more parameters in the SCI to specific values. They may also be piggybacked on the same resources used for periodic transmissions by the Rx UE.

In particular, to reduce the delay involved in requesting assistance information, an Rx UE may periodically provide assistance information to be used by its neighboring UEs. This assistance report may be periodically updated based on the resource reservations of its neighboring UEs. These periodic resource assistance reports may be also triggered by the priority of neighboring UEs and/or the CBR. These assistance reports may be also piggybacked in the same slots in which the Rx UE is performing periodic transmissions. The indication of the presence of assistance information may be either implicit or explicit. The indication may be implicit by setting one or more parameters of the SCI to specific values (e.g., setting the source ID and the destination ID to the Rx UE ID). The indication may be explicit by raising a flag in the SCI.

Figure 5:
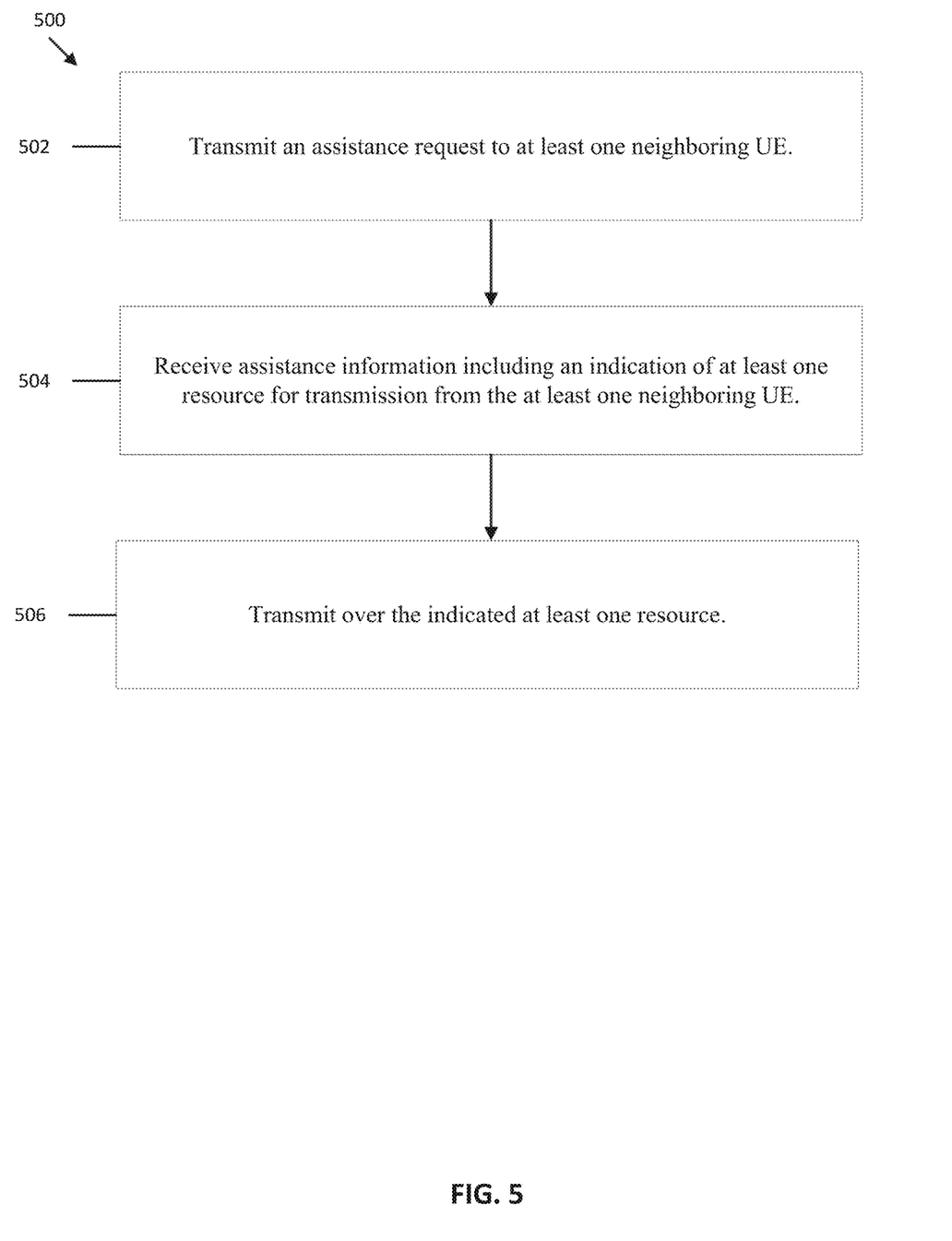
FIG. 5 illustrates a flowchart for a method of providing assistance information, according to an embodiment.

FIG. 5 illustrates a flowchart 500 for a method of providing assistance information, according to an embodiment. Any of the components or any combination of the components described (i.e., in the device diagrams) can be used to perform one or more of the operations of the flowchart 500. The operations depicted in the flowchart 500 are example operations and may involve various additional steps not explicitly provided in the flowchart 500. The order of the operations depicted in flowchart 500 is exemplary and not exclusive, as the order may vary depending on the implementation.

At 502, a UE transmits an assistance request to at least one neighboring UE. At 504, the UE receives assistance information including an indication of at least one resource for transmission from the at least one neighboring UE. At 506, the UE transmits over the indicated at least one resource. Alternatively, the UE may assign a higher priority to the indicated at least one resource.

Figure 6:
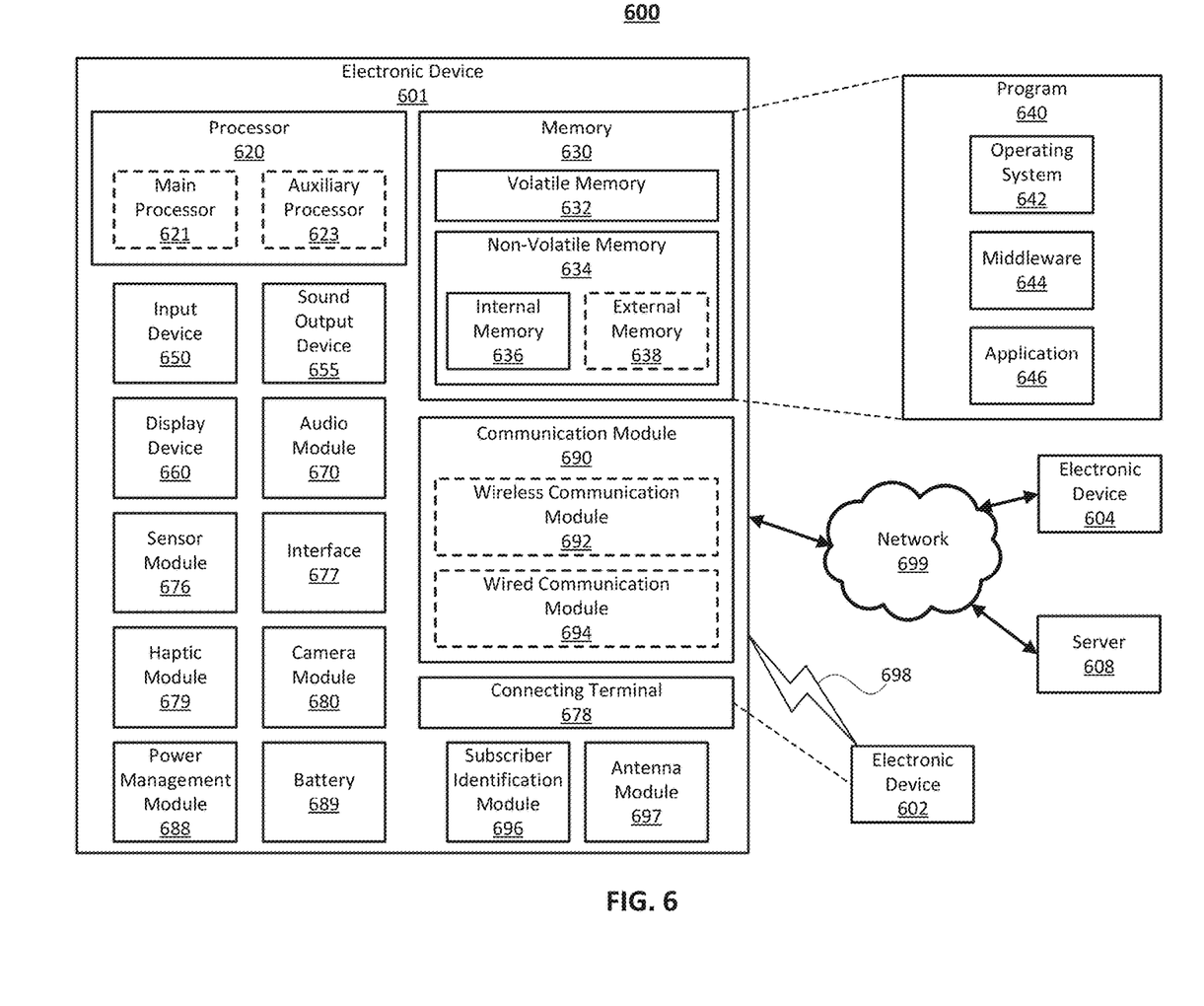
FIG. 6 illustrates a block diagram of an electronic device in a network environment, according to one embodiment.

FIG. 6 illustrates a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) there between via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   transmitting, from a first user equipment (UE), an assistance request to at least one neighboring UE;
   receiving, by the first UE and from the at least one neighboring UE, assistance information including an indication of at least one resource for transmission; and
   transmitting, from the first UE, over the indicated at least one resource,
   wherein a number of assistance requests is limited based on at least one of a channel busy ratio (CBR) or a channel occupancy ratio (CR).

2. The method of claim 1, wherein the assistance request is transmitted via sidelink control information (SCI).

3. The method of claim 2, wherein the assistance request is explicit in a field in the SCI.

4. The method of claim 1, wherein the assistance request is set by using a reserved value for a field in sidelink control information (SCI).

5. The method of claim 1, wherein the assistance request is transmitted on a resource where a physical sidelink feedback channel (PSFCH) is transmitted.

6. The method of claim 5, wherein the assistance request is transmitted with a Zadoff-Chu (ZC) sequence.

7. The method of claim 5, wherein the received assistance information further includes an identification (ID) corresponding to the transmitted assistance request.

8. The method of claim 1, further comprising performing, by the first UE, an initial transmission,
   wherein transmitting the assistance request is performed only when the initial transmission fails.

9. The method of claim 1, wherein the assistance request is transmitted on a physical sidelink feedback channel (PSFCH).

10. The method of claim 1, wherein the number of assistance requests is further limited based on at least one of priority, periodicity, transport block (TB) size, or packet delay budget (PDB).

11. A first user equipment (UE), comprising:
    a memory; and
    a processor configured to:
       transmit, an assistance request to at least one neighboring UE;
       receive, from the at least one neighboring UE, assistance information including an indication of at least one resource for transmission; and
       transmit over the indicated at least one resource,
       wherein a number of assistance requests is limited based on at least one of a channel busy ratio (CBR) or a channel occupancy ratio (CR).

12. The first UE of claim 11, wherein the assistance request is transmitted via sidelink control information (SCI).

13. The first UE of claim 12, wherein the assistance request is explicit in a field in the SCI.

14. The first UE of claim 11, wherein the assistance request is set by using a reserved value for a field in sidelink control information (SCI).

15. The first UE of claim 11, wherein the assistance request is transmitted on a resource where a physical sidelink feedback channel (PSFCH) is transmitted.

16. The first UE of claim 15, wherein the assistance request is transmitted with a Zadoff-Chu (ZC) sequence used for data encoding on the PSFCH.

17. The first UE of claim 15, wherein the received assistance information further includes an identification (ID) corresponding to the transmitted assistance request.

18. The first UE of claim 11, wherein the processor is further configured to perform an initial transmission, and
    wherein the processor is configured to transmit the assistance request only when the initial transmission fails.

19. The first UE of claim 11, wherein the assistance request is transmitted on a physical sidelink feedback channel (PSFCH).

20. The first UE of claim 11, wherein the number of assistance requests is further limited based on at least one of priority, periodicity, transport block (TB) size, or packet delay budget (PDB).

* * * * *